July 2, 1963 H. W. MEISSNER 3,096,421
SUPERCONDUCTING CONTACT DEVICES
Filed April 16, 1958 2 Sheets-Sheet 1

INVENTOR
HANS W. MEISSNER
BY Walter G. Finch
ATTORNEY

TIN AND COPPER PLATING

TIN AND COPPER PLATING

INVENTOR
HANS W. MEISSNER
BY Walter G. Finch
ATTORNEY

United States Patent Office 3,096,421

Patented July 2, 1963

3,096,421

SUPERCONDUCTING CONTACT DEVICES

Hans W. Meissner, Baltimore, Md., assignor of fifty percent to Walter G. Finch, Baltimore, Md.

Filed Apr. 16, 1958, Ser. No. 728,966
16 Claims. (Cl. 200—166)

This invention relates generally to electrical circuit elements, and more particularly the invention pertains to superconducting contacts.

The art of superconductivity is concerned with the principle of zero resistivity exhibited by certain metals at a temperature near to that of liquid helium. Various circuits and networks have been devised to make use of this property.

In computer work especially a large number of connections are involved between circuit elements. For ease of servicing and to enable various combinations to be set up as required, it is desirable that plug-in and switch connections be made possible. Unfortunately the metals which exhibit superconductivity generally are of a class which make poor contact after exposure to atmospheric conditions and have other poor properties, such as galling, which make them unsuitable for reliable contacts. The use of an intermediate normal metal connector device is not possible because the circuit as a whole thereby becomes ohmic. Therefore, in the past it has been necessary to weld the entire network into one continuous body of superconductive metal or to join the various parts by superconductive solders.

A principal object of this invention is to obtain reliable superconducting contact devices through the utlization of a thin layer of protective coating of non-superconducting metal on a superconducting element or elements, whereby the normal conducting protective coating prevents the formation of oxides which would inhibit superconductivity of the contact device.

A superconducting contact device as used in this specification is defined as a plug and receptacle, as a switch, or equivalent arrangements, which in closed position have zero resistance, and in which electrical contact is made at at least one point or at at least one line, in which the latter case the device is referred to as a superconducting line contact device. A contact is defined as the region in which two parts of an electrical device touch each other to close an electrical circuit. A superconducting contact is defined as such a contact which has zero resistance. A point of contact, as used in this specification, is defined as a very small area through which the current from one member to the other member of the contact is channeled. A line of contact is defined as an area of elongated shape through which said current is channeled.

In the art of superconductivity, it is a well known fact, as pointed out by David Shoenberg, "Superconductivity," Cambridge University Press, 2nd edition, 1952, page 3, that it is impossible to decide with certainty from measurements at temperatures at which a metal is normal conducting whether it will become superconducting at a lower temperature. There has been even some speculation that at sufficiently low temperatures all metals will become superconducting. For the purpose of this invention, a metal shall be called a normal conductor if, at the temperature of application the metal is normal conducting even though it may become superconducting at a lower temperature. The temperature at which a metal becomes superconducting is called the "Transition Temperature," as pointed out by David Shoenberg, on page 3, of his book referred to above.

These and other objects and advantages of this invention will become more readily apparent and understood from the accompanying specification and drawings in which.

Figures 1, 2, 8:
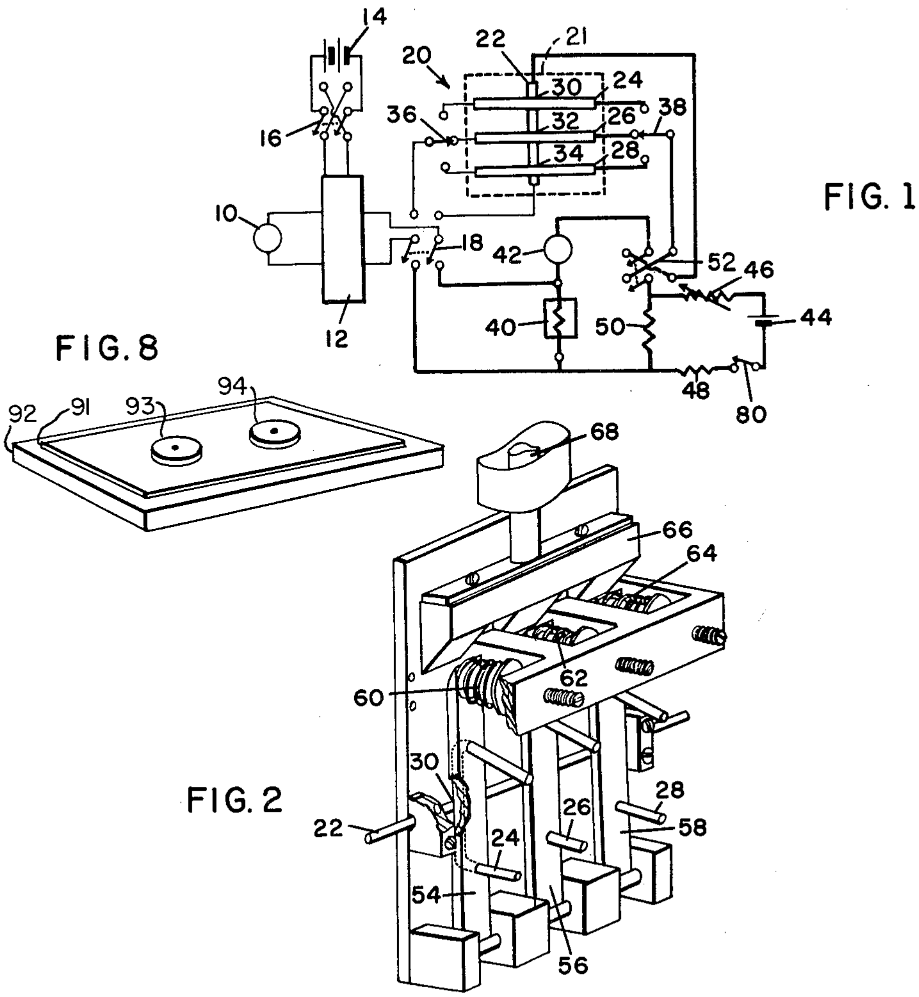
FIG. 1 is a schematic diagram of a laboratory apparatus for determining superconductivity of contacts.
FIG. 2 is a perspective view partly broken away of a contact making device used in FIG. 1.
FIG. 8 is a perspective illustrating the non-superconducting arm, superconducting wire and protective coating formed in one piece to form a point contact.

Referring now to FIG. 1, a galvanometer 10 in circuit with a potentiometer 12, a reversing switch 16, and a source of potential 14, are used to measure potential differences. A switch 18 permits bridging this measuring circuit either across a standard resistor 40 or across one of a set of sample contacts 30, 32, or 34 selected by a switch 36. Contacts 30, 32, and 34 consist of crossovers of a wire 22 with wires 24, 26 and 28 being in a frame 20.

An electric current measured by a meter 42 is made to flow serially through one of the contacts 30, 32, or 34 and the standard resistor 40. The current supply is a battery 44, and an adjustable voltage dropping network consisting of resistors 46, 48 and 50. A switch 38 is used to select the desired contact and a switch 52 permits reversal of current flow therethrough.

The construction of the sample contact mount 20 is best seen in FIG. 2. Hinged arms 54, 56, and 58 are provided to press each contact wire 24, 26, and 28 respectively, against wire 22 as urged by springs 60, 62, and 64. A wedge block 66 equipped with a handle 68 permits opening and closing of the contacts 30, 32, and 34. The sample contact mount 20, including the contacts, is submerged in liquid helium contained in a housing 21 to obtain the temperatures at which superconductivity occurs.

Figure 9:
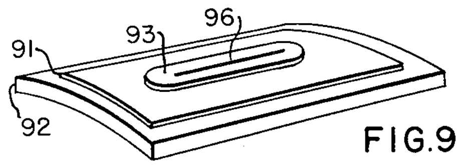
FIG. 9 is a perspective view corresponding to FIG. 8 of a line contact.

While in the structure shown in FIG. 2, wires 24, 26, and 28 supported by the hinged arms 54, 56, and 58 were used, in the practical application of the invention, the non-superconductive arm, superconductive wire and protective coating may be made all in one piece, as shown schematically in FIGS. 8 and 9, by applying a superconducting layer 91 onto a non-superconductive base structure 92, with the layer having a non-superconductive protective coating 93, thereon, at least at points 94, 95 where contact with other circuit elements is desired, as shown particularly in FIG. 8, or as a line contact 96 as shown in FIG. 9.

The present invention deals with crossed wires of tin although the principle of the invention applies to other materials exhibiting superconductivity, such as lead, indium, niobium, tantalum, niobiumnitride, or alloys or combinations thereof. It should be understood that silver, gold, nickel, chromium, platinum, rhodium, and copper are representative of non-superconductive metals. Plots, not shown, were made of resistance versus current for bare tin contacts. Below 3.62° K., the tin contacts are superconducting showing no resistance at low currents, with the resistance sharply rising at a critical current.

Figure 4:
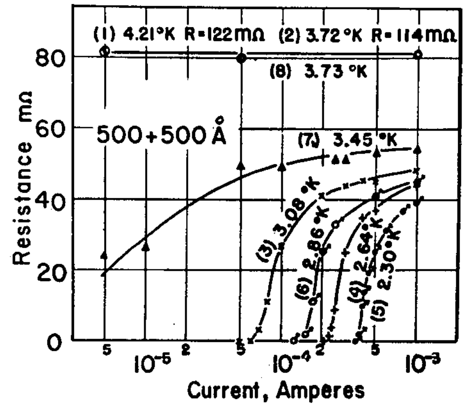
FIG. 4 is a graphical representation of superconductivity of a superconducting contact made according to the principles of this invention.
Figure 5:
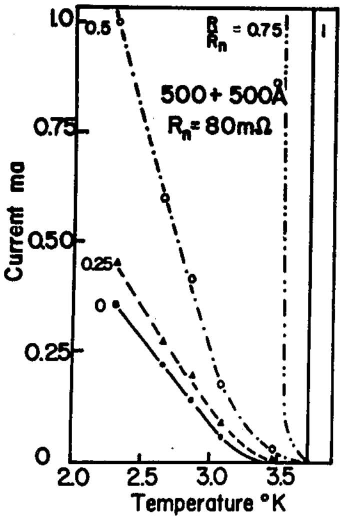
FIG. 5 is another graphical representation of the data of FIG. 4.

A copper plating was applied to the specimen tin wires which therefore made copper to copper contact after mounting and the experiment was repeated (see FIG. 4). The copper plating in this instance was 500 A. (angstrom units) in thickness for each wire (500+500 A.). The numbers on the curves give the sequence and the temperature of the measurements. It is to be noted that the superconductivity which is characteristic of bare tin contacts is exhibited despite the copper overlay. FIG. 5 is known as a diagram-of-state for the above contact. It is drawn from the data of FIG. 4 and has lines of constant resistance in current-temperature (I-T) space. The contact is superconducting in the area below and to the left of the curve $R/R_n$ equal zero. Therefore, this area defines the range of currents and temperatures useful for superconducting contact devices.

Figure 7:
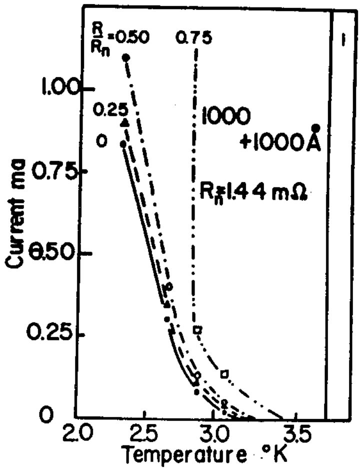
FIG. 7 is a graphical representation of the data from FIG. 6 presented in different form.
Figure 6:
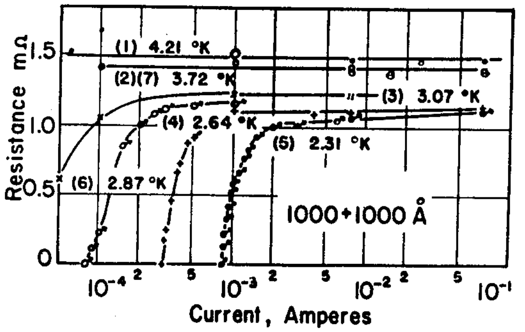
FIG. 6 is a graphical representation of superconducting properties of another superconducting contact made according to the principles of this invention.

As further evidence that superconductivity can be achieved with still heavier plating, the curves of FIGS. 6 and 7 are offered. The overlay is copper 1000 A. in thickness. In both diagrams-of-state of FIGS. 5 and 7 as pointed out above, useful superconductivity exists to the left of the curves of zero resistance.

Figure 3:
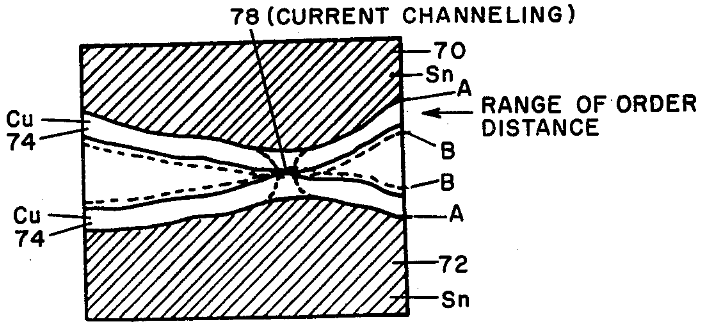
FIG. 3 is an enlarged cross-section of an electrical superconducting contact.

FIG. 3 shows, in magnified cross-section, the channeling of the current through the contact area 78 in a typical contact according to the principles of this invention.

Shaded areas 70 and 72 are the superconductive metal bodies of upper and lower contact parts, respectively, with normal metal plating overlays 74 and 76. It is assumed that the density of the superconducting electrons does not go abruptly to zero at the boundaries of the metal bodies 70 and 78 but extends outwardly some distance A—B (dotted lines) known as the range-of-order distance. So long as this distance A—B encompasses the thickness of the normal conducting plating, the contact as a whole can be made superconducting. This range-of-order distance has been known in the prior art for a long time and is the basis for phenomena occurring at the boundary between the superconducting phase and the normal phase of the same metal, as pointed out by David Shoenberg, "Superconductivity," Cambridge University Press, Cambridge, 1952, pp. 212–213.

Reference is made to an article by A. B. Pippard, Proc. Roy. Soc., vol. A216, pp. 547 seq. (1953) in which the range-of-order distance has first been estimated as of about 10,000 Angstroms. This value applies to boundaries between a superconducting and normal conducting phase of the same metal. In the sense of a two fluid model of superconductivity, that is, of a model of a fluid of superconducting electrons intermixed with a fluid of normal conducting electrons, the range-of-order distance is the distance over which the superconducting electrons will drift through such an interface. The fact that the superconducting electrons do not only drift into the normal phase of a superconducting metal but also into another normal metal makes this invention possible.

It is to be particularly noted that once superconductivity has been found for contacts employing one particular base metal and one particular protective coating, it is certain that superconductivity will within the proper range of currents, temperature, and plating thicknesses, be found with any other superconducting base metal and any other normal conducting plating metal.

In the broad application of this invention, the superconducting devices can be given mechanical strength or desired mechanical properties by the use of non-superconducting substructures or superstructures. For example, a superconducting circuit may be printed on an insulating board, said circuit having a normal conducting protective coating at least at points where contact is made to other circuits. Other examples are wiper arms for switches made from a material with suitable elastic properties, covered with a layer of a superconducting material which is then protected by a normal conducting coating.

Obviously many other modifications and variations of the invention are possible in light of the above teachings. It is, therefore, to be understood that within the scope of the appended claims the invention may be practiced otherwise than as specifically described.

What is claimed is:

1. A superconducting contact device which, in a closed position, has zero resistance, comprising, at least two superconducting base members, a protective coating of normal conducting metal on said base members, said protective coatings of said normal conducting metals on said base members each having a thickness less than the range-of-order distance of superconducting electrons, said base members being arranged to contact each other through their respective coatings of normal conducting metal at at least one point of contact, and means for maintaining said superconducting base members at a temperature below their respective superconducting transition temperatures.

2. A circuit element for use in an at least partially superconducting electrical circuit, comprising, a non-superconducting base structure, at least one superconducting layer of metal covering at least a part of said non-superconducting base structure, a normal conducting protective coating of metal of a thickness less than the range-of-order distance of superconducting electrons and covering said superconducting layer of metal at least at one point where contact to at least one other circuit element is desired, and means for maintaining said superconducting layer of metal at a temperature below its superconducting transition temperature.

3. A superconducting contact device which, in a closed position, has zero resistance, comprising, at least two superconducting base members, a protective coating of normal conducting metal on said base members, said protective coatings of said normal conducting metal on said base members each having a thickness less than the range-or-order distance of superconducting electrons, said base members being arranged to contact each other through their respective coatings of normal conducting metal at at least one point of contact.

4. A circuit element for use in an at least partially superconducting electrical circuit, comprising, a non-superconducting base structure, at least one superconducting layer of metal covering at least a part of said non-superconducting base structure, and a normal conducting protective coating of metal of a thickness less than the range-of-order distance of superconducting electrons covering said superconducting layer of metal at least at one point where contact to at least one other circuit element is desired.

5. A circuit element for use in an at least partially superconducting circuit, comprising, a structure having at least a portion thereof which is superconducting, a coating of normal conducting metal covering at least one point of said superconducting portion of said structure, said coating of normal conducting metal being of a thickness less than the range-of-order distance of superconducting electrons and being normal conducting at the temperature at which it is used in said circuit but which may at a lower temperature become superconducting.

6. A superconducting contact device which, in a closed position, has a zero resistance, comprising, at least two superconducting base members, a protective coating of normal conducting metal taken from the group consisting of silver, gold, nickel, chromium, copper, rhodium, and platinum, as well as alloys and combinations thereof, on said base members, said protective coatings of said normal conducting metals on said base members each having a thickness less than the range-of-order distance of superconducting electrons, said base members being arranged to contact each other through their respective coatings of normal conducting metal at at least one point of contact, and means for maintainnig said superconducting base members at a temperature below their respective superconducting transition temperatures.

7. A superconducting contact device which, in a closed position, has zero resistance, comprising, at least two superconducting base members, a protective coating of normal conducting metal taken from the class of aluminum, cadium, zinc, and combinations thereof on said base members, said protective coatings of said normal conducting metals on said base members each having a thickness less than the range-of-order distance of superconducting electrons, said base members being arranged to contact each other through their respective coatings of normal conducting metal at at least one point of contact, and means for maintaining said superconducting base members at a temperature below their respective superconducting transition temperatures.

8. A circuit element for use in an at least partially superconducting circuit, comprising, a metal structure having at least a portion thereof which is superconducting, a coating of normal conducting metal taken from the group consisting of silver, gold, nickel, chromium, copper, rhodium, and platinum, as well as alloys and combinations thereof covering at least one point of said superconducting portion of said metal structure, said coating of normal conducting metal being of a thickness less than the range-of-order distance of superconducting electrons and being normal conducting at the temperature at which it is used in said circuit but which may at a lower temperature become superconducting, and means for maintaining said circuit element at a temperature below its superconducting transition temperature.

9. A circuit element for use in an at last partially superconducting circuit, comprising, a metal structure having at least a portion thereof which is superconducting taken from the group consisting of tin, lead, indium, niobium, tantalum, niobiumnitride, as well as other alloys and combinations thereof, a coating of normal conducting metal taken from the group consisting of silver, gold, nickel, chromium, copper, rhodium, and platinum, as well as alloys and combinations thereof, covering at least one point of said superconducting portion of said metal structure, said coating of normal conducting metal being of a thickness less than the range-of-order distance of superconducting electrons and being normal conducting at the temperature at which it is used in said circuit but which may at a lower temperature become superconducting, and means for maintaining said circuit element at a temperature below its superconducting transition temperature.

10. A superconducting contact device which, in a closed position, has zero resistance, comprising, at least two superconducting base members taken from a group consisting of tin, lead, indium, niobium, tantalum, niobiumnitride, as well as alloys and combinations thereof, a protective coating of normal conducting metal on said superconducting base members, said protective coatings of said normal conducting metals on said superconducting base members each having a thickness less than the range-of-order distance of superconducting electrons, said base members being arranged to contact each other through their respective coatings of normal conducting metal at at least one point of contact, and means for maintaining said superconducting base members at a temperature below their respective superconducting transition temperatures.

11. A superconducting contact device as recited in claim 10, wherein said protective coating of normal conducting metal is taken from the group consisting of silver, gold, nickel, chromium, copper, rhodium, and platinum, as well as alloys and combinations thereof.

12. A superconducting contact device as recited in claim 10, wherein said protective coating of normal conducting material is one which at the temperature at which the contact is used is normal conducting but which at a lower temperature may become superconducting.

13. A superconducting contact device as recited in claim 10, wherein said protective coating of normal conducting metal is taken from the class of aluminum, cadmium, zinc, and combinations thereof.

14. A circuit element for use in an at least partially superconducting circuit, comprising, a metal structure having at least a portion thereof which is superconducting taken from the group consisting of tin, lead, indium, niobium, tantalum, niobiumnitride, as well as alloys and combinations thereof, a coating of normal conducting metal covering at least one point of said superconducting portion of said metal structure, said coating of normal conducting metal being of a thickness less than the range-of-order distance of superconducting electrons and being normal conducting at the temperature at which it is used in said circuit but which may at a lower temperature become superconducting, and means for maintaining said circuit element at a temperature below its superconducting transition temperature.

15. A circuit element as recited in claim 14, wherein said coating of normal conducting metal is taken from the group consisting of silver, gold, nickel, chromium, copper, rhodium, and platinum, as well as alloys and combinations thereof.

16. A circuit element as recited in claim 14, wherein said normal conducting protective coating of metal is one which at the temperature at which said circuit element is used is normal conducting but which at a lower temperature may become superconducting.

References Cited in the file of this patent

UNITED STATES PATENTS

| | | |
|---|---|---|
| 1,180,614 | Simpson | Apr. 25, 1916 |
| 1,342,801 | Gebauer | June 8, 1920 |
| 2,189,122 | Andrews | Feb. 6, 1940 |
| 2,282,097 | Taylor | May 5, 1942 |
| 2,866,842 | Matthias | Dec. 30, 1958 |
| 2,946,030 | Slade | July 19, 1960 |
| 2,958,836 | McMahon | Nov. 1, 1960 |
| 2,973,441 | Pratt | Feb. 28, 1961 |

FOREIGN PATENTS

| | | |
|---|---|---|
| 170,577 | Switzerland | Oct. 1, 1934 |
| 613,926 | Germany | May 28, 1935 |
| 448,097 | Canada | Apr. 27, 1948 |

OTHER REFERENCES

Superconductivity, by C. W. Hewlett, General Electric Review, June 1946; pages 19–25.

Superconductivity, Wireless World, July 1957; pages 326–330.